United States Patent [19]
Kutina et al.

[11] 3,831,984
[45] Aug. 27, 1974

[54] QUICK DISCONNECT COUPLING

[75] Inventors: Thomas J. Kutina, Mentor-on-the-Lake; James P. Staten, North Madison; Sydney L. Kershaw, South Euclid, all of Ohio

[73] Assignee: Parker-Hannifin Corporation, Cleveland, Ohio

[22] Filed: Nov. 8, 1971

[21] Appl. No.: 196,629

[52] U.S. Cl.................... 285/73, 285/352, 285/379
[51] Int. Cl............................................. F16l 37/24
[58] Field of Search........... 285/74, 352, 73, 72, 71, 285/70, 75, 76, 77, 78, 79, 65, 66, 67, 68, 69, 382.7, 379; 277/178, 206, 168, 9, 32

[56] References Cited
UNITED STATES PATENTS

| 489,107 | 1/1893 | Storz..................... | 285/73 |
|---|---|---|---|
| 653,143 | 7/1900 | Martin................... | 285/79 |
| 913,144 | 2/1909 | James et al............ | 285/67 |
| 1,065,515 | 6/1913 | Ewert.................... | 285/68 X |
| 2,689,140 | 9/1954 | Bonacci................. | 285/69 |
| 3,055,684 | 9/1962 | Currie................... | 285/382.7 X |
| 3,499,655 | 3/1970 | Czernik et al......... | 277/178 X |
| 3,758,137 | 9/1973 | Kershaw................ | 285/70 |

FOREIGN PATENTS OR APPLICATIONS

| 899,609 | 8/1944 | France................. | 277/178 |
|---|---|---|---|

Primary Examiner—Thomas F. Callaghan
Attorney, Agent, or Firm—John N. Wolfram

[57] ABSTRACT

A quick coupling comprising a pair of coupling elements adapted to be connected to each other, each element having a deformable annular gasket retained on an inturned flange at an end of the element for sealing engagement with each other at their outer end faces when the coupling elements are connected. The outer and inner end faces of the gaskets are frusto-conical and the gaskets are symmetrical about a central plane so as to be reversible. The gaskets at their inner ends have an initial clearance with transverse and circumferential walls of the coupling elements to permit rocking of the gaskets about the flange whereby during axial connecting movement of the two elements the frusto-conical outer gasket faces rock and deform into a planar position with a minimum of mass deformation during a major part of the connecting movement and with the gasket inner ends engaging the transverse shoulders near the completion of the connecting movement whereby sufficient mass deformation of the gaskets occurs to increase the sealing contact between the gaskets and to ensure adequate resistance to disconnect movement of the elements.

2 Claims, 3 Drawing Figures

PATENTED AUG 27 1974      3,831,984

QUICK DISCONNECT COUPLING

BACKGROUND OF THE INVENTION

This invention is an improvement in the type of coupling shown in U.S. Pat. No. 3,498,641 wherein two coupling elements each have lugs and recesses for coupling the elements to each other and each has a deformable gasket mounted at an end thereof, the gaskets being engageable with each other for sealing the joint between the coupling elements when the latter are connected. Each gasket is retained on an inturned flange of the coupling elements and its inner end is initially closely adjacent a transverse shoulder axially spaced from the flange. The outer faces of the gaskets have initial planar contact over a substantial area that results in a rapid buildup of coupling force with relatively little axial connecting movement of the coupling elements. The coupling force quickly becomes accentuated upon contact of the gasket inner ends with the shoulders. Moreover, because the coupling elements are of cast metal there can be substantial variation in the dimensions of the lugs and recesses with the additional result that the coupling force may be either execssive for manual connection of the parts or it may be insufficient for obtaining sealing contact between the gaskets.

BRIEF DESCRIPTION OF THE INVENTION

The present invention overcomes the above mentioned difficulties with the prior device in that each gasket has a frusto-conical outer face so that initial engagement between two gaskets is substantially circular line contact adjacent the bore through the gasket. Such line contact spreads to substantial area contact upon completion of coupling. During coupling, the gasket material undergoes both rocking action and deformation of its mass as the frusto-conical surfaces are forced into planar contact with each other. When the parts are fully connected, the contact pressure between the gaskets is greatest in the region of initial circular line contact and gradually decreases toward the outer diameter for efficient sealing with minimum total contact force.

Each gasket has a substantial initial clearance between its inner end and a transverse shoulder of the coupling element and between the outer diameter of the inner end and a circumferential wall of the coupling element so that the gasket may rock about the inturned flange upon which it is mounted without interference from either the shoulder or circumferential wall during a major part of the axial connecting movement following initial contact of the gaskets. The gasket inner end contacts the shoulder during the final portion of the connecting movement to provide significant but not excessive resistance to such final movement for ensuring sufficient sealing contact between the gaskets and to prevent accidental uncoupling of the elements.

The conical outer faces of the gaskets plus the rocking action permit attainment of sufficient sealing contact between the gaskets with a relatively large variation in the axial connecting movement whereby dimensional variations in the locking lugs and recesses on the coupling elements have relatively little effect on the coupling force and on the effectiveness of the seal.

DESCRIPTION OF THE INVENTION

Figure 1:
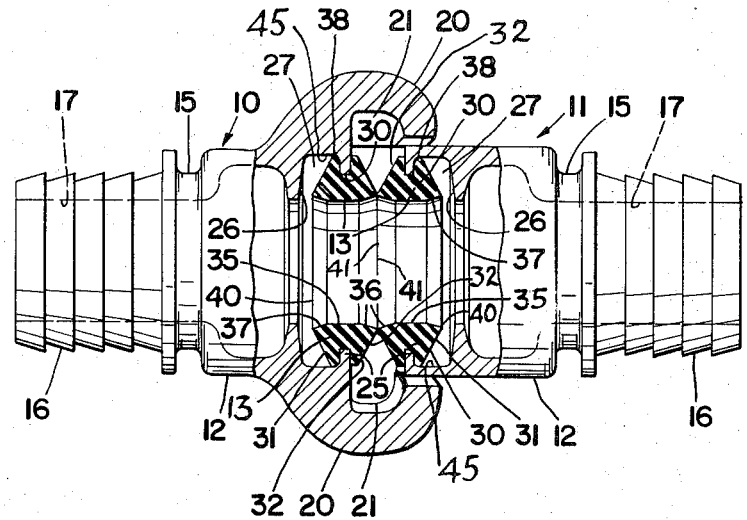
FIG. 1 is a view, partly in cross section, of two coupling elements about to be connected and with the gaskets shown in their initial undeformed condition.

The complete device includes a pair of identical coupling elements 10, 11. Each coupling element includes identical one piece metallic bodies 12 of cast metal and a gasket 13 of synthetic rubber or other elastomeric or resilient and deformable material. Bodies 12 at their outer ends have tubular extensions 15 that may have a series of barbs 16 formed thereon for connection to a rubber hose, and each body 12 has a fluid passage 17 therethrough.

At its inner end each body 12 has a pair of projections 20 with recesses 21 formed therein to receive lugs 22 of the other body member in interlocking engagement for connecting the two coupling elements 10, 11 to each other. Each lug 22 has an axially projecting nub 28 that interlocks with an axial projection 29 in recess 21 to prevent inadvertent rotary disconnect motion of the coupling halves.

Each body 12 at is inner end has an inturned annular flange 25 and axially spaced therefrom is an annular transverse shoulder 26 so as to form an enlarged recess 27 between flange 25 and shoulder 26.

Each gasket 13 has an annular groove 30 at its midpoint and has frusto-conical inner and outer end faces 31, 32 that have an angle of about 30° with a transverse plane. Each gasket 13 has a central bore 35 that is outwardly flared at about a 15° angle at its end as indicated at 36, 37. Each gasket has a short cylindrical peripheral portion 38, 39 of about 1/32 inch length on each side of its groove 30. The cylindrical portions 38 are initially in snug contact with the outer cylindrical wall of recesses 27. Inner faces 31 and flared bore portions 37 meet at circular edges 41. Circular edges 40 and frusto-conical inner faces 31 are initially spaced from shoulders 26. In a typical coupling, recess 27 may be about ¼ inch in axial length between shoulder 26 and flange 25 and edge 40 initially may be about one-sixteenth inch from shoulder 26. Moreover, faces 31 are radially spaced from circumferential walls 45 of recesses 27.

Figure 2:
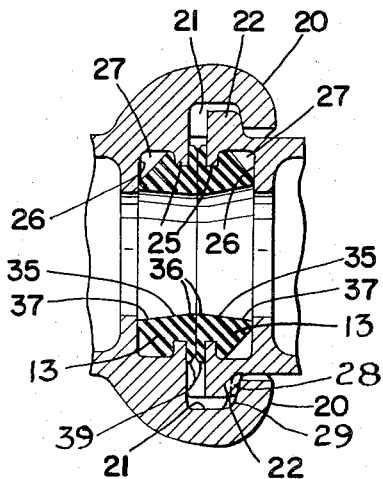
FIG. 2 is a fragmentary cross section view showing the coupling elements fully assembled.
Figure 3:
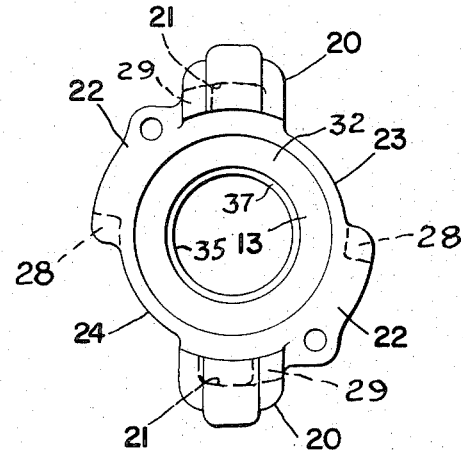
FIG. 3 is an end view of one of the coupling elements.

To assemble the coupling, bodies 12 are brought together with the circular portions 23, 24 of one body member circumferentially aligned with projections 20 of the other body member until the two gaskets 13 lightly contact each other in line contact at edges 41 as shown in FIG. 1. The coupling elements 10, 11 are then forcibly pushed toward each other to rock and deform the gaskets to the position substantially as shown in FIG. 2. One coupling element is then rotated relative to the other to move nubs 28 on lugs 22 into recesses 21 past axial projections 29. Upon releasing the parts, the coupling elements 10, 11 will be moved apart slightly by the resistance of the gaskets to deformation and rocking to lock projections 28 behind projections 29 to prevent accidental uncoupling rotation of the elements relative to each other. The parts will then appear as in FIG. 2.

As the gaskets become deformed from their initial shape and position as shown in FIG. 1 to that of FIG. 2, the outer faces 32 rock about flange 25 and deform into a plane that is normal to the axis of the coupling to establish a wide area of sealing contact between the two gaskets. At the same time, the inner portions of the gaskets rock or pivot about flange 25, such rocking occurring with substantially no interference from circumferential walls 45 because of the radial clearances between inner faces 31 and walls 45 and because of the short axial contact of cylindrical portions 38 with walls 45. Also, because of the substantial initial axial clearances between inner faces 31 and shoulders 26, which at inner corners 40 is about one fourth the distance between flanges 25 and shoulders 26, inner corners 40 remain out of contact with shoulders 26 for a major portion of the axial connecting travel of elements 10 and 11 after initial contact of the gaskets with each other. During the final portion of the connecting travel inner corners 40 will contact shoulders 26 and be flattened out a small amount as shown in FIG. 2 but this does not excessively increase resistance to connecting travel because corners 40 are sharp with an acute included angle so that the amount of gasket material involved in the flattening is quite small and hence the resistance to such flattening is not great. However, this resistance to flattening by contact of corners 40 with shoulders 26 toward the end of the connecting travel assists in holding the projections 28 interlocked with projections 29 to prevent accidental rotation of the coupling elements relative to each other with consequent accidental disconnect.

Thus, the rocking motion of the gaskets without significant interference from walls 45 and shoulders 26 coupled with initial line contact at edges 41 afforded by the frusto-conical faces 32 permits axial connecting travel of elements 10, 11 with less manual force than would otherwise be the case. Also, the connecting force does not increase as rapidly as axial connecting travel occurs. As a result, there can be a greater variation in the amount of travel without excessive variation in the manual force for accomplishing the same and there can be greater variation in dimension of the lugs 22 and recesses 21 without requiring excessive variation in the force for connecting the parts.

The cutaway portion on faces 31 for providing the axial and radial clearances with shoulders 26 and walls 45 may be on an angle identical to that of faces 32 and with the same diametric limits whereby the gaskets are symmetrical about a central transverse plane and therefore reversible. This makes it impossible to install the gaskets backward and also permits reversing in the installation for doubling the life thereof when the faces on the outer sides become worn or damaged.

As edges 41 are pressed together during axial connecting travel, some of the elastromeric material in the region of these edges deforms radially inward. To prevent such inwardly deformed material from constricting the bore through the gaskets, bores 35 are chamfered at 36 as shown in FIG. 1. As a result, the inwardly deformed material in this region closes down to about the initial diameter of bore 35, as shown in FIG. 2.

Likewise, contact of inner edges 40 with shoulders 26 causes radially inward deformation of gasket material in this region as well. Chamfers 37 may not be needed at this location to prevent actual constriction of bores 35 because the diameter of inner edges 40 tend to increase as the gaskets rock into contact with shoulders 26 but chamfers 37 are nevertheless provided to make the gaskets reversible.

To uncouple, elements 12 are grasped manually and pushed toward each other to deform and deflect the gaskets slightly more than shown in FIG. 2 and to cause axial disengagement of projections 28 from projection 29. The elements may then be rotated relative to each other to withdraw lugs 22 from recess 21 so that the elements are disconnected from each other and may be axially separated.

We claim:

1. In a coupling system that includes a pair of coupling members each having a fluid passageway therethrough and an enlarged recess adjacent one end of the passageway forming a transverse wall and a circumferential wall, an inturned flange spaced axially outwardly from said transverse wall, each coupling member having means for coupling to the other member with said inturned flanges adjacent but spaced from each other, a resilient element mounted in each recess and having an external groove receiving a corresponding one of said inturned flanges, each resilient element being identical to the other and each initially having conical axial inner and outer end faces, said inner end faces being initially axially spaced from the corresponding transverse wall and radially spaced from said circumferential wall, each resilient element being deformable by contact of its axially outer end face of the other resilient element during coupling of the members to each other whereby said outer end faces move into sealing engagement with each other and said axially inner end faces move into engagement with the corresponding transverse wall, the ends of each resilient element on opposite sides of a centerline therebetween are formed identical to each other whereby each resilient element may be reversed in its position on side inturned flange so that the inner axial end becomes the outer axial end and vice versa, the angle of said conical faces is about 60° with the longitudinal axis of the elements and major portions of the axial outer conical faces are deformed into 90° relationship with the longitudinal axis of the elements upon coupling of the members, and the axially inner ends of elements are moved into a position with their conical faces at an angle of substantially less than 60° with respect to said longitudinal axis but yet remaining out of contact with said circumferential wall.

2. A coupling system that includes a pair of coupling members each having a fluid passageway therethrough, an enlarged recess adjacent one end of the passageway that forms a transverse wall and a circumferential wall, an inturned flange spaced axially outwardly from the transverse wall, each coupling member having means for coupling to the other member with said flanges adjacent but spaced from each other, a resilient gasket mounted on each member, each gasket being identical to the other and each having a central opening therethrough and an external groove that receives a corresponding one of said flanges, each gasket having axially inner and outer portions on opposite sides of its groove that have frusto-conical faces at their free ends that substantially intersect the corresponding opening, said outer portions initially contacting each other at said inner sections when said members are coupled, said inner portion of each gasket being initially axially spaced from the corresponding transverse wall and throughout a major portion of its axial length from its free end toward the respective groove being initially and finally radially spaced from said circumferential wall whereby each gasket is rocked about its flange without interference from said circumferential wall by pressure of the gaskets against each other during coupling of said members, and said inner and outer portions on opposite sides of a centerline therebetween being identical in size and shape whereby each gasket may be reversed on its flange so that its inner portion becomes its outer portion, and vice versa.

* * * * *